United States Patent
Abe et al.

(10) Patent No.: US 6,798,566 B2
(45) Date of Patent: Sep. 28, 2004

(54) VARIABLE OPTICAL GAIN EQUALIZER AND VARIABLE BRANCHING RATIO BEAM SPLITTER

(75) Inventors: Shohei Abe, Shizuoka (JP); Hidenori Nakada, Aichi (JP); Mototsugu Goto, Shizuoka (JP); Ikuo Maeda, Shizuoka (JP); Hideo Takeshita, Aichi (JP); Hiroaki Ono, Aichi (JP); Shusuke Wada, Shizuoka (JP)

(73) Assignee: FDK Corporation, Tokyo (JP)

( * ) Notice: Subject to any disclaimer, the term of this patent is extended or adjusted under 35 U.S.C. 154(b) by 0 days.

(21) Appl. No.: 10/173,237

(22) Filed: Jun. 13, 2002

(65) Prior Publication Data

US 2002/0191274 A1 Dec. 19, 2002

(30) Foreign Application Priority Data

| Jun. 15, 2001 | (JP) | 2001-182480 |
| Jun. 15, 2001 | (JP) | 2001-182519 |
| Sep. 11, 2001 | (JP) | 2001-274811 |
| Nov. 6, 2001 | (JP) | 2001-340441 |

(51) Int. Cl.$^7$ ................................................ H01S 3/00
(52) U.S. Cl. ............................... 359/337; 359/337.13
(58) Field of Search ......................... 359/337.1, 337.13, 359/337

(56) References Cited

U.S. PATENT DOCUMENTS 5,299,056 A  *  3/1994  Kurata et al. ............... 359/341
6,088,153 A  *  7/2000  Anthon et al. .............. 359/341
6,407,836 B1 *  6/2002  Fukushima ................. 359/124

FOREIGN PATENT DOCUMENTS

JP            11-224967            8/1999

OTHER PUBLICATIONS

English language translation of Japanese Patent Application No. 11-224967 (item A).

* cited by examiner

*Primary Examiner*—Mark Hellner
(74) *Attorney, Agent, or Firm*—Heller Ehrman White & McAuliffe

(57) ABSTRACT

A variable optical gain equalizer in accordance with one embodiment of the present invention comprises a variable branching ratio beam splitter having a variable polarization rotator, the variable branching ratio beam splitter branching an input light beam into two light beams at an arbitrary power ratio, through control of the rotation angle of the polarization direction by the variable polarization rotator; an optical filter presenting different filter characteristics to the two branched output light beams; and a polarization coupler for polarization coupling the two light beams that have passed through the optical filter, wherein the rotation angle of the polarization direction is controlled by the variable polarization rotator so as to vary the spectra of the output light beams.

30 Claims, 7 Drawing Sheets

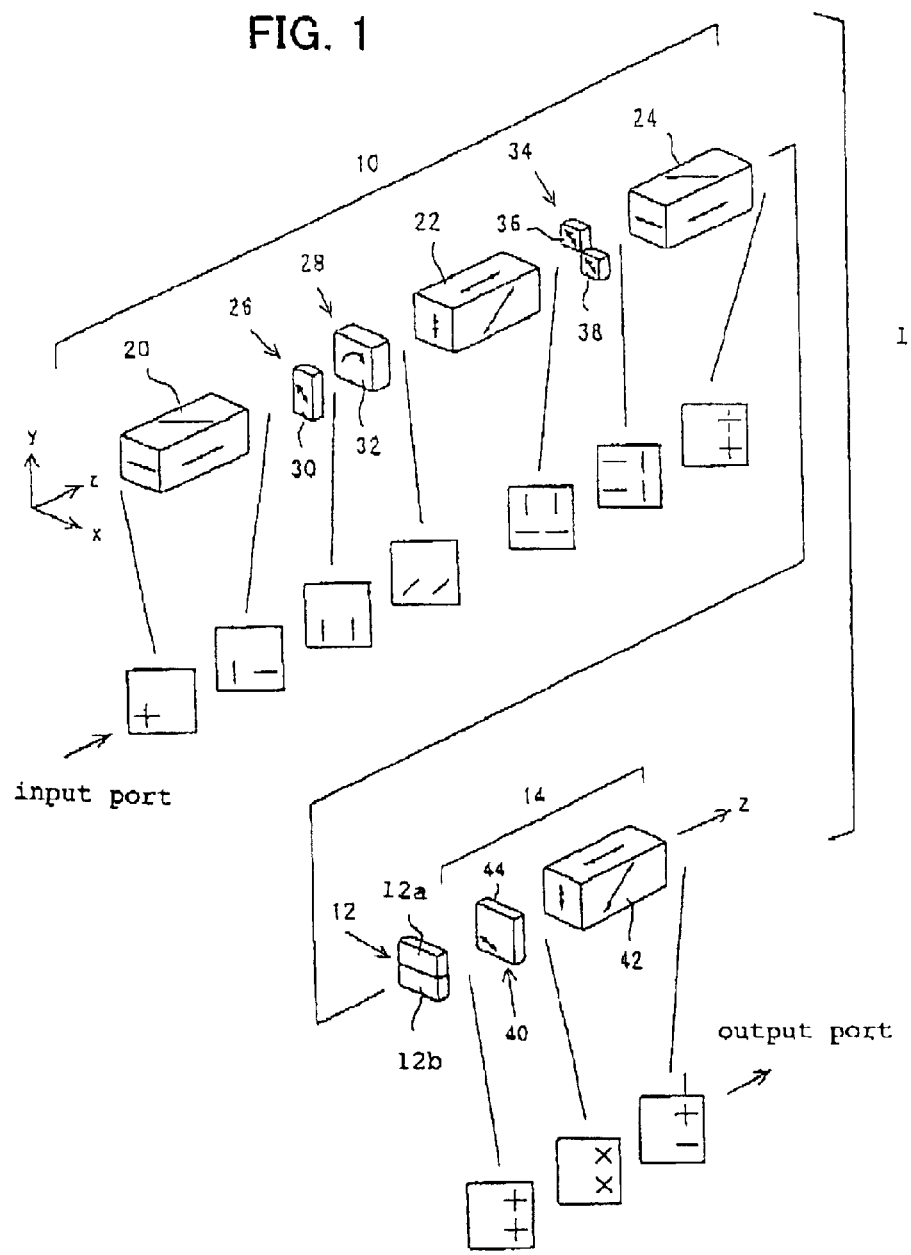

FIG. 2A   FIG. 2B   FIG. 2C
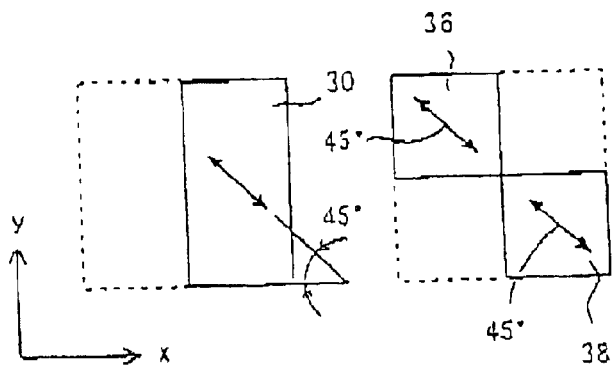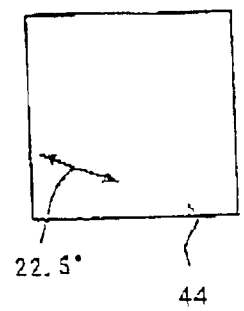
FIG. 3A
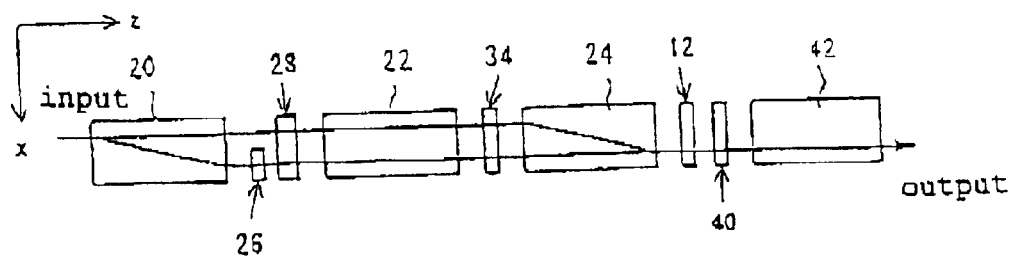
FIG. 3B
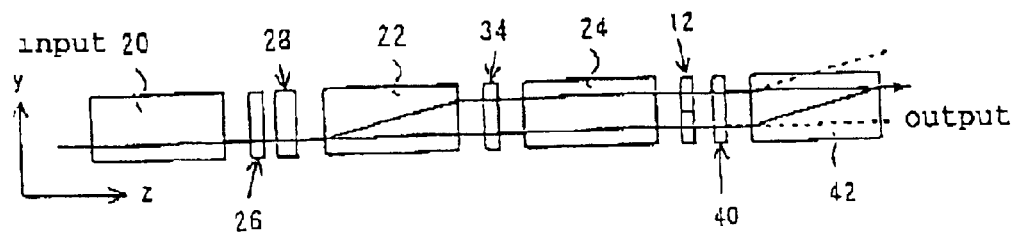

input port

VARIABLE OPTICAL GAIN EQUALIZER AND VARIABLE BRANCHING RATIO BEAM SPLITTER

BACKGROUND OF THE INVENTION

1. Field of the Invention

The present invention relates to a variable optical gain equalizer that converts an input light beam into an output light beam having a desired spectrum, and to a variable branching ratio beam splitter that is applied to the variable optical gain equalizer, etc., for branching the input light beam into two light beams at an arbitrary power ratio. These are especially useful techniques in, e.g., switching network or long-distance communication in optical communications.

2. Description of the Related Arts

In optical communication system using optical fibers as transmission lines, WDM (Wavelength Division Multiplexing) was developed as techniques for increasing the transmission capacity. This is an optical communication method in which a multiplicity of light signals having different wavelengths are transmitted through a single optical fiber. 8–32 waves wavelength multiplexing has hitherto been attempted, but recently more multiple wavelength multiplexing is also being studied.

Meanwhile, in order to render long-distance optical transmission feasible, the optical communication system having the transmission lines in the form of the optical fibers incorporates optical amplifiers to amplify signal light and thereby compensate for loss which may occur in the optical fibers, etc. In case of incorporating the optical amplifiers into the optical fiber transmission lines in the WDM optical communication system, however, there is a need to equalize the gain, due to the wavelength characteristics of amplification gains of the optical amplifiers. Means for gain equalization may be a single optical filter or a plurality of optical filters, having desired transmittance or desired insertion loss wavelength characteristics.

An optical equalizer constructed from a combination of a plurality of optical filters is capable of offsetting the transmitted light wavelength characteristics by the insertion loss waveform characteristics presented by the optical filters, in a given WDM signal light bandwidth. In contrast with the optical filter based loss wavelength characteristics being unvaried, however, the transmitted light wavelength characteristics vary by changes with time of other various optical elements used in the optical fiber transmission lines, making it difficult to offset the transmitted light wavelength characteristics by the optical filter wavelength characteristics. Switching of the optical fiber transmission lines also causes changes in the transmitted light wavelength characteristics, which changes could not be offset.

In order to solve the above problem, for example, Japanese Patent Laid-open Pub No. Hei11-224967 discloses a technique where a fixed optical gain equalizer is combined in series with a variable optical gain equalizer. The variable optical gain equalizer in this art is a combination of a variable optical attenuator and an optical amplifier. By utilizing the characteristics of the optical amplifier that depending on the light input level the state of operation varies and the optical amplifier gain wavelength characteristics also changes, this change is adjusted through the control of attenuation of the variable optical attenuator so as to accommodate the variance of the light input level.

However, this configuration is based on regulating the level of light input into the optical amplifiers by use of the fixed optical gain equalizer, and hence the fixed optical gain equalizer combined with the optical amplifier having specific characteristics has inevitably a restricted choice. Therefore, the adjustable light input level range is not too wide.

SUMMARY OF THE INVENTION

It is therefore an object of the present invention to provide a variable optical gain equalizer capable of freely converting an input light beam into an output light beam having a desired spectrum. This object includes providing a variable optical gain equalizer capable of easily performing gain equalization indispensable for the optical communication system, modifications resulting from path changes and modifications of changes with time of paths, as well as providing a variable optical gain equalizer of a structure suitable formodularization, allowing all optical elements to be integrated into a single package.

Another object of the present invention is to provide a variable branching ratio beam splitter applicable to, e.g., the variable optical gain equalizer of the present invention.

According to a first aspect of the present invention there is provided a variable optical gain equalizer comprising a variable branching ratio beam splitter having a variable polarization rotator, the beam splitter branching an input light beam into two light beams at an arbitrary power ratio, through control of the rotation angle of the polarization direction by the variable polarization rotator; an optical filter presenting different filter characteristics to the two branched output light beams; and a polarization coupler for polarization coupling the two light beams that have passed through the optical filter; wherein the rotation angle of the polarization direction is controlled by the variable polarization rotator so as to vary the spectra of the output light beams.

According to a second aspect of the present invention there is provided a variable optical gain equalizer comprising a variable branching ratio beam splitter for branching an input light beam into two light beams for output at an arbitrary ratio; an optical filter associated with at least one of branched outputs of the variable branching ratio beam splitter; and an optical coupler for coupling the branched two output light beams together; wherein the branching ratio of the variable branching ratio beam splitter is controlled so as to be able to adjust the spectra of light beams to finally be coupled by the optical coupler.

According to a third aspect of the present invention there is provided a variable optical gain equalizer comprising a beam multi-branching unit for branching an input light beam into three or more light beams; an optical filter associated with at least one of branched outputs of the beam multi-branching unit; and an optical star coupler for coupling together light beams branched by the beam multi-branching unit; wherein the beam multi-branching unit includes a variable branching ratio beam splitter disposed at one or more branched parts of the beam multi-branching unit, for branching an input light beam into two light beams for output at an arbitrary ratio; and wherein the branching ratio of the variable branching ratio beam splitter is controlled so as to be able to adjust the spectra of light beams to finally be coupled together by the optical star coupler.

According to a fourth aspect of the present invention there is provided a variable optical gain equalizer comprising a beam multi-branching unit including a plurality of variable branching ratio beam splitters which are in cascade connection, each variable branching ratio beam splitter branching an input beam into two light beams for output at an arbitrary ratio; an optical filter associated with at least one of branched outputs of the beam multi-branching unit; and an optical star coupler for coupling together light beams branched by the beam multi-branching unit; wherein the branching ratio of each of the plurality of variable branching ratio beam splitters is properly controlled so as to be able to adjust the spectra of light beams to finally be coupled together by the optical star coupler.

According to a fifth aspect of the present invention there is provided a variable optical gain equalizer comprising a variable branching ratio beam splitter which includes, at spaced apart locations in the mentioned order, a birefringent element for separation that separates light beams whose polarization directions are orthogonal to each other, input from the same optical path, into different optical paths; a birefringent element for optical path control that controls the optical path depending on the polarization direction; and a birefringent element for synthesis that synthesizes light beams whose polarization directions are orthogonal to each other, traveling along different optical paths; wherein the variable branching ratio beam splitter includes, between the birefringent element for separation and the birefringent element for optical path control, a polarization rotator for converting the polarization direction from orthogonal relationship to parallel relationship; and a variable polarization rotator for rotating arbitrary angles the polarization direction of light beams having parallel relationship, converted by the polarization rotator; wherein the variable branching ratio beam splitter includes, between the birefringent element for optical path control and the birefringent element for synthesis, a polarization controller for rotating 90 degrees the polarization direction of light beams traveling along two optical paths having specific diagonal relationship, the polarization controller keeping the polarization direction of light beams traveling along two optical paths having the other diagonal relationship; and wherein the angle of rotation of the polarization direction effected by the variable polarization rotator is controlled so as to branch an input light beam for output at a properly adjusted ratio.

According to a sixth aspect of the present invention there is provided a variable branching ratio beam splitter comprising, at spaced apart locations in the mentioned order, a birefringent element for separation that separates light beams whose polarization directions are orthogonal to each other, input from the same optical path, into different optical paths; a birefringent element for optical path control that controls the optical path depending on the polarization direction; and a birefringent element for synthesis that synthesizes light beams whose polarization directions are orthogonal to each other, traveling along different optical paths; wherein the variable branching ratio beam splitter comprises, between the birefringent element for separation and the birefringent element for optical path control: a polarization rotator for converting the polarization direction from orthogonal relationship to parallel relationship; and a variable polarization rotator for rotating arbitrary angles the polarization direction of light beams having parallel relationship, converted by the polarization rotator; wherein the variable branching ratio beam splitter comprises, between the birefringent element for optical path control and the birefringent element for synthesis: a polarization controller for rotating 90 degrees the polarization direction of light beams traveling along two optical paths having specific diagonal relationship, the polarization controller keeping the polarization direction of light beams traveling along two optical paths having the other diagonal relationship; and wherein the angle of rotation of the polarization direction effected by the variable polarization rotator is controlled so as to branch an input light beam for output at a properly adjusted ratio.

BRIEF DESCRIPTION OF THE DRAWINGS

The above and other objects, aspects, features and advantages of the present invention will become more apparent from the following detailed description when taken in conjunction with the accompanying drawings, in which:

FIG. 1 is an explanatory diagram of a first embodiment of a variable optical gain equalizer in accordance with the present invention;

FIGS. 2A to 2C are explanatory diagrams of the optical axis of a ½ wave plate for use in a polarization rotator, a polarization controller and a 45-degree polarization rotator, respectively, of the first embodiment;

FIGS. 3A and 3B are explanatory diagrams of optical paths of the first embodiment;

DESCRIPTION OF THE PREFERRED EMBODIMENTS

Figure 4:
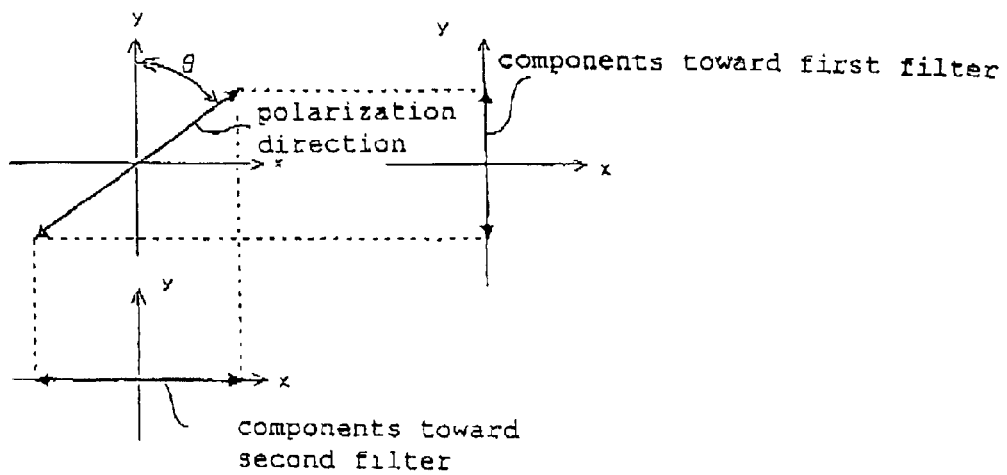
FIG. 4 shows the relationship between the optical branching ratio and the orientation of rotation of polarization effected by a variable polarization rotator in the first embodiment.

A variable optical gain equalizer in accordance with an aspect of the present invention comprises a variable branching ratio beam splitter having a variable polarization rotator, the beam splitter branching an input light beam into two light beams at an arbitrary power ratio, through control of the rotation angle of the polarization direction by the variable polarization rotator; an optical filter presenting different filter characteristics to the two branched output light beams; and a polarization coupler for polarization coupling the two light beams that have passed through the optical filter;

wherein the rotation angle of the polarization direction is controlled by the variable polarization rotator so as to vary the spectra of the output light beams.

For example, in this variable optical gain equalizer, the polarization coupler may include a 45-degree polarization rotator for rotating 45 degrees the polarization direction of two light beams that have passed through the optical filter; and a birefringent element for coupling which couples together ordinary light components of one output light beam and extraordinary light components of the other output light beam, of two light beams that have passed through the 45-degree polarization rotator. The 45-degree polarization rotator can be a 45-degree Faraday rotator or a linear phase shifter.

Another aspect of the present invention provides a variable optical gain equalizer comprising a variable branching ratio beam splitter for branching an input light beam into two light beams for output at an arbitrary ratio; an optical filter associated with at least one of branched outputs of the variable branching ratio beam splitter; and an optical coupler for coupling the branched two output light beams together; wherein the branching ratio of the variable branching ratio beam splitter is controlled so as to be able to adjust the spectra of light beams to finally be coupled by the optical coupler.

Yet another aspect of the present invention provides a variable optical gain equalizer comprising a beam multi-branching unit for branching an input light beam into three or more light beams; an optical filter associated with at least one of branched outputs of the beam multi-branching unit; and an optical star coupler for coupling together light beams branched by the beam multi-branching unit; wherein the beam multi-branching unit includes a variable branching ratio beam splitter disposed at one or more branched parts of the beam multi-branching unit, for branching an input light beam into two light beams for output at an arbitrary ratio; and wherein the branching ratio of the variable branching ratio beam splitter is controlled so as to be able to adjust the spectra of light beams to finally be coupled together by the optical star coupler.

Still another aspect of the present invention provides a variable optical gain equalizer comprising a beam multi-branching unit including a plurality of variable branching ratio beam splitters which are in cascade connection, each variable branching ratio beam splitter branching an input beam into two light beams for output at an arbitrary ratio; an optical filter associated with at least one of branched outputs of the beam multi-branching unit; and an optical star coupler for coupling together light beams branched by the beam multi-branching unit; wherein the branching ratio of each of the plurality of variable branching ratio beam splitters is properly controlled so as to be able to adjust the spectra of light beams to finally be coupled together by the optical star coupler. In the variable optical gain equalizer provided with the beam multi-branching parts, all the variable branching ratio beam splitters at the final stage of the beam multi-branching unit may be associated with corresponding optical filters each having different optical filter characteristics.

The optical filter employed in the variable optical gain equalizer of the present invention can be a dielectric multilayered film filter, an etalon filter, or an optical fiber grading filter.

All optical elements used may be mounted on a single substrate or housed in a single enclosure, to obtain a modularized variable optical gain equalizer.

The variable branching ratio beam splitter included in the above variable optical gain equalizer can be one which comprises, at spaced apart locations in the mentioned order, a birefringent element for separation that separates light beams whose polarization directions are orthogonal to each other, input from the same optical path, into different optical paths; a birefringent element for optical path control that controls the optical path depending on the polarization direction; and a birefringent element for synthesis that synthesizes light beams whose polarization directions are orthogonal to each other, traveling along different optical paths; wherein the variable branching ratio beam splitter comprises, between the birefringent element for separation and the birefringent element for optical path control, a polarization rotator for converting the polarization direction from orthogonal relationship to parallel relationship; and a variable polarization rotator for rotating arbitrary angles the polarization direction of light beams having parallel relationship, converted by the polarization rotator; wherein the variable branching ratio beam splitter comprises, between the birefringent element for optical path control and the birefringent element for synthesis, a polarization controller for rotating 90 degrees the polarization direction of light beams traveling along two optical paths having specific diagonal relationship, the polarization controller keeping the polarization direction of light beams traveling along, two optical paths having the other diagonal relationship; and wherein the angle of rotation of the polarization direction effected by the variable polarization rotator is controlled so as to branch an input light beam for output at a properly adjusted ratio.

This variable branching ratio beam splitter has various modified forms or applied forms. The variable optical gain equalizer including the following variable branching ratio beam splitter also falls within the scope of the present invention.

The variable optical gain equalizer according to a further aspect of the present invention may include the variable branching ratio beam splitter having the variable polarization rotator, which variable polarization rotator is a 90-degree Faraday rotator comprised of a combination of a Faraday element and an electromagnet applying a variable magnetic field to the Faraday element. The variable polarization rotator may be a liquid crystal polarization rotator, or a rotatable linear phase shifter.

The variable optical gain equalizer may include the variable branching ratio beam splitter having the polarization rotator, which polarization rotator is comprised of a linear phase shifter disposed on one optical path of two optical paths separated by the birefringent element for separation, or of a pair of linear phase shifters each disposed on corresponding one of two optical paths separated by the birefringent element for separation, the pair of liner phase shifters each having an optical axis that points the symmetrical direction.

The variable optical gain equalizer may include the variable branching ratio beam splitter having the polarization controller, which polarization controller is comprised of a first linear phase shifter disposed on both one of two optical paths having the specific diagonal relationship in which the polarization directions are rotated 90 degrees and an optical path adjoining the one path, and of a second linear phase shifter disposed on both the other of the two optical paths having the specific diagonal relationship in which the polarization directions are rotated 90 degrees and an optical path adjoining the other path, the first and second linear phase shifters being disposed in an overlapped manner on the optical paths.

The variable optical gain equalizer may include the variable branching ratio beam splitter which uses a ½ wave plate of quart as a linear phase shifter or which uses a plane-parallel rutile single crystal as a birefringent element. As used herein, the "plane-parallel" refers to a geometric configuration having an entry surface and an exit surface which are parallel to each other. In this case, the entry surface need not be strictly normal to the incident light. The plane-parallel shape can include a parallel plate shape, a parallelogrammic block shape, a rectangular parallelepiped shape, etc.

The variable branching ratio beam splitter in accordance with a yet further aspect of the present invention comprises, at spaced apart locations in the mentioned order, a birefringent element for separation that separates light beams whose polarization directions are orthogonal to each other, input from the same optical path, into different optical paths; a birefringent element for optical path control that controls the optical path depending on the polarization direction; and a birefringent element for synthesis that synthesizes light beams whose polarization directions are orthogonal to each other, traveling along different optical paths; wherein the variable branching ratio beam splitter comprises, between the birefringent element for separation and the birefringent element for optical path control, a polarization rotator for converting the polarization direction from orthogonal relationship to parallel relationship; and a variable polarization rotator for rotating arbitrary angles the polarization direction of light beams having parallel relationship, converted by the polarization rotator; wherein the variable branching ratio beam splitter comprises, between the birefringent element for optical path control and the birefringent element for synthesis, a polarization controller for rotating 90 degrees the polarization direction of light beams traveling along two optical paths having specific diagonal relationship, the polarization controller keeping the polarization direction of light beams traveling along two optical paths having the other diagonal relationship; and wherein the angle of rotation of the polarization direction effected by the variable polarization rotator is controlled so as to branch an input light beam for output at a properly adjusted ratio.

This variable branching ratio beam splitter has various modified forms or applied forms. The following variable branching ratio beam splitter also falls within the scope of the present invention:

A variable branching ratio beam splitter comprising a variable polarization rotator which is a 90-degree Faraday rotator comprised of a combination of a Faraday element and an electromagnet applying a variable magnetic field to the Faraday element.

The variable polarization rotator may be a liquid crystal polarization rotator, or a rotatable linear phase shifter.

The variable branching ratio beam splitter may comprise a polarization rotator which is comprised of a linear phase shifter disposed on one optical path of two optical paths separated by the birefringent element for separation, or of a pair of linear phase shifters each disposed on corresponding one of two optical paths separated by the birefringent element for separation, the pair of liner phase shifters each having an optical axis that points the symmetrical direction.

A variable branching ratio beam splitter comprising a polarization controller which is comprised of a first linear phase shifter disposed on both one of two optical paths having the specific diagonal relationship in which the polarization directions are rotated 90 degrees and an optical path adjoining the One path, and of a second linear phase shifter disposed on both the other of the two optical paths having the specific diagonal relationship in which the polarization directions are rotated 90 degrees and an optical path adjoining the other path, the first and second linear phase shifters being disposed in an overlapped manner on the optical paths;

There also fall within the scope of the present invention a variable branching ratio beam splitter which uses a ½ wave plate of quart as a linear phase shifter or a variable branching ratio beam splitter which uses a plane-parallel rutile single crystal as a birefringent element.

As is well known, the beam splitters are used in a diversity of applications, such as being incorporated in the communication paths or optical elements in the optical communication system. Naturally, the variable branching ratio beam splitter of the present invention could also be applied to other apparatuses than the variable optical gain equalizers.

Variable Optical Gain Equalizer

First Embodiment

FIG. 1 is an explanatory diagram of a first embodiment of a variable optical gain equalizer of the present invention, showing the arrangement of optical elements and the polarization direction of a light beam passing through the optical elements. In this diagram, arrows within each optical element indicate the orientation of the optical axis and the direction of Faraday rotation. Z direction represents a direction where the optical element is arrayed, x and y directions represent two directions orthogonal to z direction. The clockwise direction when viewed z direction is defined as plus direction of rotation.

The variable optical gain equalizer is generally designated at 1 and comprises a variable branching ratio beam splitter 10 that branches an input light beam into two light beams at an arbitrary power ratio through control of the rotational angle in the polarization direction by use of a variable polarization rotator 28, an optical filter 12 that presents different filter characteristics to the two branched output light beams, and a polarization coupler 14 that polarization couples two filter transmitted light beams.

The variable branching ratio beam splitter 10 has the following optical configuration; At spaced apart locations in z direction are arranged, in the mentioned order, a birefringent element 20 for separation serving to separate light beams having orthogonal polarization directions On the same optical path into x direction, a birefringent element 22 for optical path control that permits ordinary light beams to travel straight but shifts the optical path of extraordinary light beams to +y direction, depending on the polarization direction, and a birefringent element 24 for synthesis serving to synthesize light beams having orthogonal polarization directions on different optical paths in x direction. Toward z direction, between the birefringent element 20 for separation and the birefringent element 22 for optical path control are disposed a polarization rotator 26 that converts the polarization direction from orthogonal relationship to parallel relationship, and a variable polarization rotator 28 that rotates those polarization directions through any angles. Between the birefringent element 22 for optical path control and the birefringent element 24 for synthesis is disposed a polarization controller 24 that rotates 90 degrees the polarization direction of light beams on two optical paths having a specific diagonal relationship and that keeps the polarization direction of light beams on two optical paths having other diagonal relationship.

In this embodiments, the birefringent elements 20, 22 and 24 are plane-parallel rutile single crystals, and the polarization rotator 26 is a ½ wave plate 30 made of quartz inserted into only the right-hand optical path, with its optical axis being tilted 45 degrees with respect to x-axis as shown in FIG. 2A.

The variable rotator 28 is a 90-degree variable Faraday rotator in the form of a combination of a Faraday element 32 and an electromagnet not shown for applying a variable magnetic field to the Faraday element 32. The variable rotator 28 is capable of controlling rotation of the polarization direction within the range of 0 to 90 degrees. As is well known, the Faraday element 32 is formed of Bi-substituted rare-earth iron garnet single crystal, etc.

A polarization controller 34 consists of a pair of identical ½ wave plates 36 and 38 made of quartz, each having an optical axis tilted 45 degrees with respect to x-axis, the pair of plates being disposed on two optical paths in a specific diagonal relationship. FIG. 2B shows the orientation of the optical axes of the ½ wave plates 36 and 38.

The optical filter 12 consists of a first filter 12a that is inserted into the upper optical path and a second filter 12b that is inserted into the lower optical path, the first and second filters 12a and 12b being juxtaposed and having different filter characteristics from each other. The filters 12a and 12b can be a dielectric multilayer filter, an etalon filter, various optical fiber grading filters, or any combination of these filters.

The polarization coupler 14 consists of a 45-degree polarization rotator 40 that rotates 45 degrees the polarization direction of light beams passing though both the filters 12a and 12b, and a birefringent element 42 for coupling that polarization couples ordinary light components of one output light and extraordinary light components of the other output light, of the 45-degree polarization rotator 40. This embodiment uses a ½ wave plate 44 of quartz as the 45-degree polarization rotator 40. Naturally, the ½ wave plate may be replaced by a 45-degree fixed Faraday rotator. This ½ wave plate 44 is oriented so that its optical axis tilts 22.5 degrees with respect to x-axis as shown in FIG. 2C.

The birefringent element 42 for coupling serves to permit the ordinary light beams to go straight but shift the optical path of extraordinary light beams to +y direction, thereby polarization coupling ordinary light components of one (upper optical path) output light and extraordinary light components of the other (lower optical path) output light, of the 45-degree polarization rotator 40. This birefringent element 42 may also be a plane-parallel rutile single crystal.

FIGS. 3A, and 3B are optical path diagrams of the variable optical gain equalizer. FIG. 3A is an optical path plan view when the optical path is projected on z-x plane, and FIG. 3B is an optical path side view when the optical path is projected on y-z plane. Toward z direction, an input port is positioned at lower left on the front side of the birefringent element 20 for separation, and an output port is positioned at upper right on the rear side of the birefringent element 14 for coupling. Of light beams input in z direction from the input port, an ordinary light beam goes straight through the birefringent element 20 for separation whereas an extraordinary light beam is refracted thereat and separated in x direction. The light beam along the left-hand optical path bypasses the ½ wave plate 30 acting as the polarization rotator 26 and hence its polarization direction remains unchanged. On the contrary, the light beam along the right-hand optical path undergoes a rotation of its polarization direction due to the presence of the ½ wave plate 30 acting as the polarization rotator 26. As is well known, the ½ wave plate converts the polarization direction of the input light beam symmetrically with respect to its optical axis, and therefore the horizontally polarized light beam incident on the ½ wave plate 30 whose optical axis tilts 45 degrees relative to x-axis is converted into a vertically polarized light beam, for output.

Thus, the light beams along the right and left optical paths both become vertical and parallel to each other in polarization direction. Then, the two light beams whose polarization directions are parallel to each other enter the variable polarization rotator 28. At that time, when the current supply to the electromagnet is varied, the magnetic field applied to the Faraday element 32 changes and accordingly the polarization directions of the light beams that have passed the Faraday element 32 are rotated. In other words, control of the current supply enables the polarization directions of the light beams passing there through to be varied to an arbitrary angle The two light beams, whose polarization directions still remain parallel to each other but are rotated by the arbitrary angle, enter the birefringent element 22 for optical path control where ordinary light components of the two light beams travel straight and the extraordinary light components thereof are refracted and separated to +y direction (above). Of light beams traveling on the left side, a light beam along the upper left optical path is subjected to a 90-degree rotation of the polarization direction by the presence of the ½ wave plate 36 acting as the polarization controller 34, whilst a light beam along the lower left optical path bypasses both the ½ wave plates. Of light beams traveling on the right side, a light beam along the upper right optical path also bypasses both the ½ wave plates, whilst a light beam along the lower right optical path experiences a 90-degree rotation of the polarization direction by the presence of the ½ wavelength 38 acting as the polarization controller 34. Thus, the two light beams along the upper optical paths are orthogonal to each other in terms of their polarization directions, and the two light beam along the lower optical paths are also orthogonal to each other in terms of their polarization directions. Then, the birefringent element 24 for synthesis synthesizes two light beams separated in x direction so that branched light beams are output with a predetermined power ratio from the upper right optical path and the lower right optical path. FIG. 4 shows the relationship between the power ratio and the polarization direction effected by the variable polarization rotator. Let $\theta$ be the rotation angle of the polarization direction effected by the variable polarization rotator 28, when the input light power is 1, then the branched light power output from the upper optical paths is $\cos \theta$ and the branched light power output from the lower optical paths is $\sin \theta$. The input light beams are output in a manner branched at such a ratio, and the branching ratio can be adjusted through the control of the polarization rotation angle $\theta$.

Thus, when the input light beams are branched at a predetermined power ratio with the controlled polarization rotation angle $\theta$ in the variable branching ratio beam splitter 10 and are output therefrom, the resultant output light beams are transmitted through the optical filter 12. At that time, the branched output light beam along the upper optical path undergoes an attenuation by the first filter 12a and the branched output light beams along the lower optical path undergoes an attenuation by the second filter 12b. These filter transmitted light beams are subjected to 45-degree rotation of the polarization direction by the presence of the 45-degree polarization rotator 40 (½ wave plate 44). Then, the birefringent element 42 for coupling permits ordinary light components of light beams along the upper optical path to intactly travel straight and refracts extraordinary light-components of light beams along the lower optical path to y direction to thereby shift the optical path, thus outputting a coupled light beam of the two light beams from the output port. In other words, a light beam transmitted through one filter and a light beam transmitted through the other filer, of two branching-ratio adjusted light beams are polarization synthesized, and a light beam having a desired spectrum is provided as a final output.

It is to be noted that extraordinary light components of light beams along the upper optical path are refracted to +y direction to thereby shift the optical path, and therefore are not coupled to the output port. Ordinary light components of light beams along the lower optical path are intactly allowed to travel straight, and hence are not coupled to the output port, either. The reason for disposing the 45-degree polarization rotator 40 at the front stage of the birefringent element 42 for coupling is to eliminate any output variances that depend on the incident polarization state. In other words so that a light beam having a plane of polarization parallel to x-z plane and a light beam having a plane of polarization parallel to y-z plane are equally synthesized, their respective planes of polarization are rotated through 45 degrees.

Figure 5A:
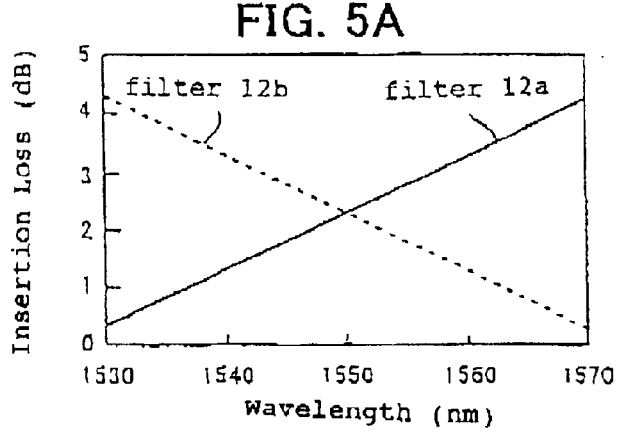
FIGS. 5A and 5B show characteristics of filters in the first embodiment and characteristics of that embodiment in itself, respectively.
Figure 5B:
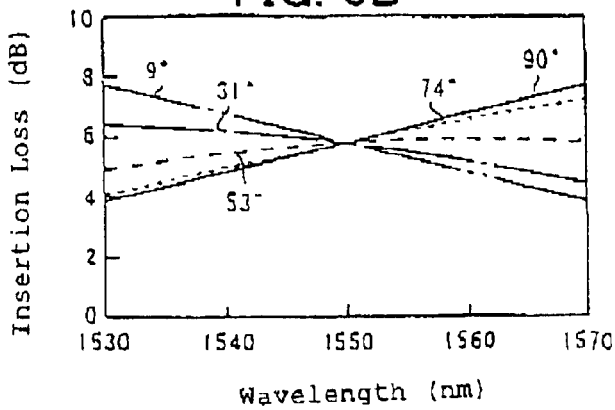

FIG. 5A shows an example of the optical filter characteristics of the optical filter. It is assumed herein that the first filter 12a and the second filter 12b present insertion loss characteristics of exactly inverted signs, to the wavelength. FIG. 5B shows optical output characteristics (insertion loss-wavelength characteristics) when the Faraday rotation angle is varied at five steps within the range of 9 to 90 degrees, using the filters 12a and 12b. From this characteristic graph, it has proved that a desired spectrum is obtained by controlling the Faraday rotation angle and adjusting the branching ratio.

By the way, the variable optical gain equalizer 1 of the above embodiment is configured such that the four birefringent elements are linearly arrayed, among which a linear phase shifter, the Faraday rotator, the optical filers, etc., are arranged, whereby it is easy to mount all the optical elements used on a single substrate or accommodate them within a single enclosure, thus achieving the modularization.

It is to be understood that the variable branching ratio beam splitter applied to the variable optical gain equalizer in the first embodiment is not limited to the above configuration, but can be any configuration as long as it includes the variable polarization rotator and is capable of variably controlling the branching ratio of the output light beams, depending on the orientation of rotation of the polarization direction effected by this rotator.

Variable Optical Gain Equalizer

Second Embodiment

Figure 6:
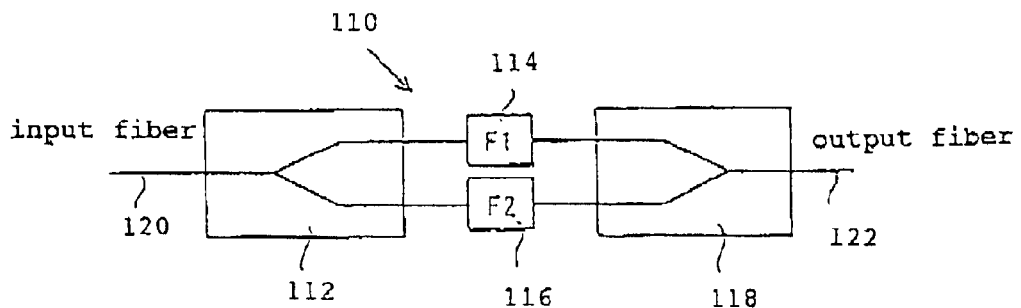
FIG. 6 is an explanatory diagram of a second embodiment of the variable optical gain equalizer in accordance with the present invention.

FIG. 6 shows a second embodiment of a variable optical gain equalizer in accordance with the present invention. The variable optical gain equalizer is generally designated at 110 and comprises a variable branching ratio beam splitter 112 for branching an input light beam into two light beams at an arbitrary ratio, a first optical filter 114 and a second optical filter 116 that are associated with the two branched outputs, and an optical coupler 118 for coupling their output light beams together. Arrangement is such that the branching ratio of the variable branching ratio beam splitter 112 is controlled so as to adjust the spectrum of an input light beam from an input optical fiber 120 and output a light beam having a desired spectrum from an output fiber 122. The variable branching ratio beam splitter 112 of the second embodiment can be substantially the same as employed in the first embodiment. It is natural that any structure can be employed as long as it is capable of outputting the optical power with a desired branching ratio. The optical filter can be a multilayered dielectric film filter, an etalon filter, various optical fiber grading filters, or any combination of such types of filters. The optical coupler 118 may be constructed from two optical fibers fused together or two optical waveguides coupled together.

Figure 7A:
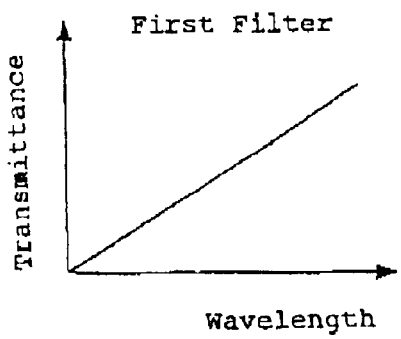
FIGS. 7A and 7B are characteristic diagrams of filters in the second embodiment.
Figure 7B:
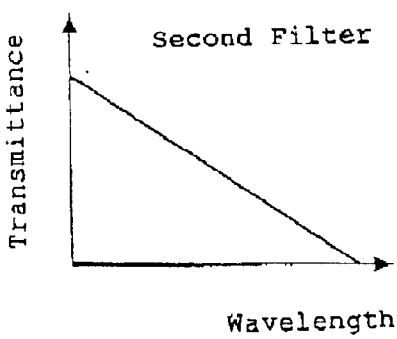
Figure 8A:
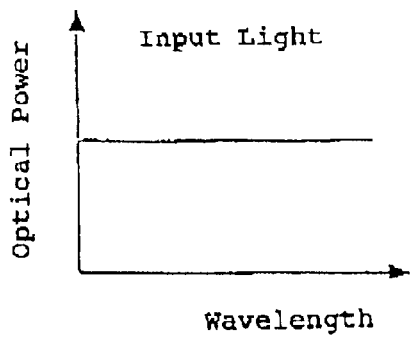
FIGS. 8A and 8B are characteristic diagrams of an input light beam and an output light beam, respectively, in the second embodiment.
Figure 8B:
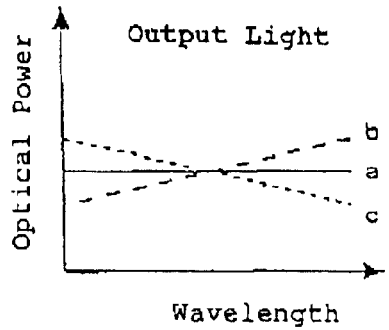

Description will then be made of operation of the variable optical gain equalizer 110 of the second embodiment. FIGS. 7A and 7B show by way of example the transmittance-wavelength characteristics of the first and second filters, respectively. The first optical filter presents a transmittance-wavelength characteristic where the transmittance rightward increases with respect to the wavelength, whereas the second optical filter presents a transmittance-wavelength characteristic where the transmittance decreases rightward with respect to the wavelength. FIGS. 8A and 8B show operation characteristics of the variable optical gain equalizer 110.

If the optical power of the input light from the input fiber 120 has a certain characteristic with respect to the wavelength as shown in FIG. 8A, the wavelength characteristic of the optical power of the output light, which is obtained by coupling together a light beam that has passed through the first optical filter 114 and a light beam that has passed through the second optical filter 116, will vary depending on the branching ratio as shown in FIG. 8B. Providing that the branching ratio of the variable branching ratio beam splitter is 1:1 so that the optical power passing through the first filter is equal to the optical power passing through the second filter, substantially a flat wavelength characteristic as indicated by line a is presented. However, unless the branching ratio is 1:1, a wavelength characteristic as indicated by line b is presented when the optical power passing through the first optical filter is greater than the optical power passing through the second optical filter, whereas a wavelength characteristic as indicated by line c is presented when the optical power passing through the first optical filter is smaller than the optical power passing through the second optical filter. Thus, using optical filters having proper transmittance (insertion loss)-wavelength characteristics, the branching ratio is controlled so as to regulate the optical powers passing through the optical filters, thereby making it possible to freely change the wavelength characteristics of output light beams and adjust them to desired states.

Variable Optical Gain Equalizer

Third Embodiment

Figure 9:
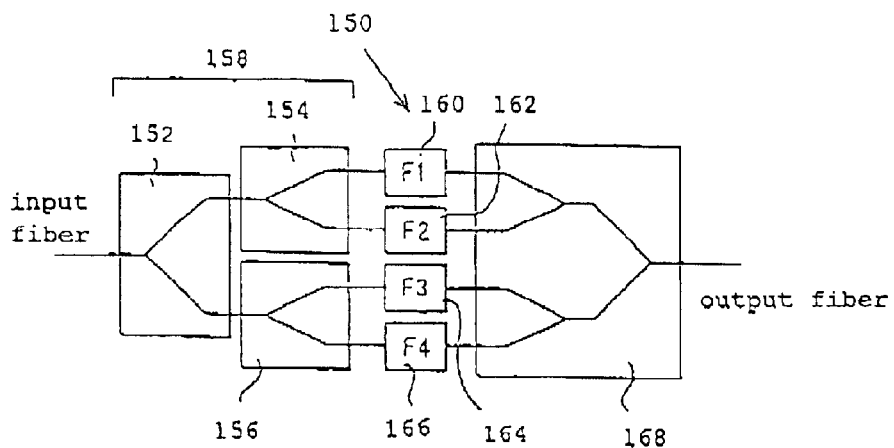
FIG. 9 is an explanatory diagram of a third embodiment of the variable optical gain equalizer in accordance with the present invention.

FIG. 9 shows an optical configuration of a variable optical gain equalizer of a third embodiment. The variable optical gain equalizer of this embodiment is generally designated at 150 and comprises a beam multi-branching unit 158 consisting of three variable branching ratio beam splitters 152, 154 and 156 that are connected in cascade, each branching an input light beam into two light beams at an arbitrary ratio; first to fourth optical filters associated with branched outputs of the splitters 154 and 156; and a 4-input 1-output optical star coupler 168 that couples together all the branched output light beams. Such a configuration enables the spectrum of the finally coupled light beam to be adjusted through control of the branching ratio of the four light beams output from the beam multi-branching unit 158. In the third embodiment, the variable branching ratio beam splitters 152, 154 and 156 can be substantially the same as employed in the first embodiment. Similarly, the optical filters 160, 162, 164 and 166 can also be the various filters or any combination of those filters. Similar to the optical coupler employed in the second embodiment, the optical star coupler 168 may be formed from a plurality of optical fibers fused together or a plurality of optical waveguides coupled together.

Figures 10A, 10B, 10C, 10D:
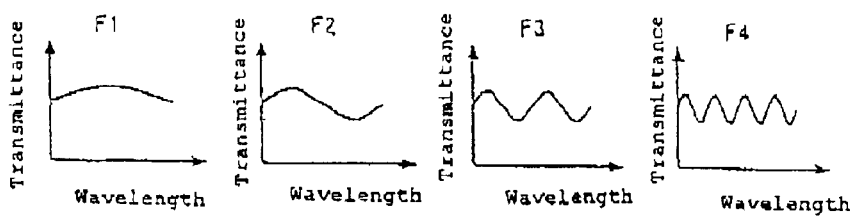
FIGS. 10A to 10E are characteristic diagrams of first to fourth filters in the third embodiment and of that embodiment in itself, respectively.
Figure 10E:
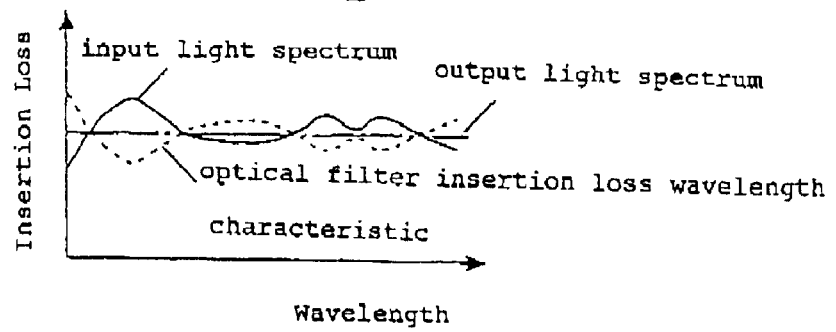

FIGS. 10A to 10D show characteristics of the first to fourth optical filters 160, 162, 164 and 166 included in the variable optical gain equalizer 150, and FIG. 10E shows synthetic optical characteristics of the variable optical gain equalizer 150. The first to fourth optical filters 160, 162, 164 and 166 each have characteristics that the transmittance sinusoidally varies with respect to the wavelength, with their cycles being reduced by half in sequence from the optical filter 160 to the optical filter 166. The input light powers to the four optical filters 160, 162, 164 and 166 are controlled by the first to third variable branching ratio beam splitters 152, 154 and 156. If the first variable branching ratio beam splitter 152 branches the input light optical power at a ratio of m:n, then the second variable branching ratio beam splitter 154 branches the optical power of m into p:q. In this manner, desired optical powers can be delivered to the optical filters 160, 162, 164 and 166.

Thus, as shown in FIG. 10E, if an input light beam having the spectrum as indicated by a solid line is adjusted so as to present the insertion loss as indicated by a broken line, through control of the optical power supplied to each optical filter, the optical power spectrum of the input light beam is offset so that an output light beam is obtained which presents a substantially unvaried insertion loss with respect to the wavelength. Thus, even though the transmission characteristics change and the input light spectrum varies as a result of change with time or switching of paths, the input light spectrum after the variance can be offset by adjusting the ratio of branching to the optical filters 160, 162, 164 and 164.

Variable Branching Ratio Beam Splitter

Modification

The variable optical gain equalizer of the first to third embodiments includes the variable branching ratio beam splitter as its constituent feature. The variable branching ratio beam splitter could variously be modified without being limited to the exemplary configurations of the above embodiments.

Figure 11:
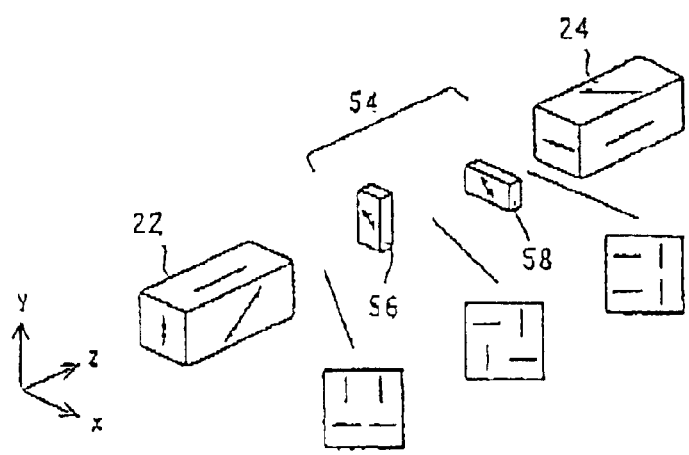
FIG. 11 is an explanatory diagram of a variant of a variable branching ratio beam splitter employed in the first to third embodiments.

FIG. 11 shows by way of example a modification of the polarization controller that is interposed between the birefringent element for optical path control and the birefringent element for synthesis. Other constituent parts than the polarization controller generally designated at 54 are referenced by the same reference numerals as in the variable branching ratio beam splitter 1 of FIG. 1, and for ease of understanding, only the constituent, parts from the birefringent element 22 for optical path control up to the birefringent element 24 for synthesis are shown.

Figure 12A:
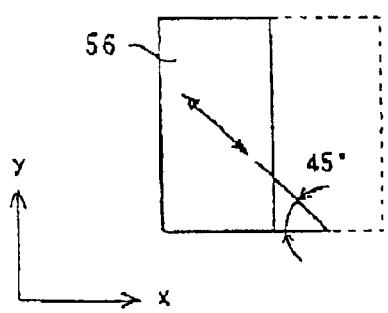
FIGS. 12A and 12B are explanatory diagrams of the geometry and optical axis of two ½ wave plates making up the polarization controller.
Figure 12B:
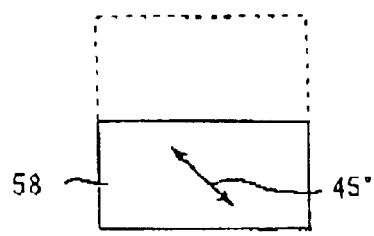

The modified polarization controller 54 is comprised of a ½ wave plate 56 that is disposed on the upper and lower, left optical paths, and a ½ wave plate 58 that is disposed on the lower, right and left optical paths. This means that the two ½ wave plates 56 and 58 overlap on the lower left optical path. Both the ½ wave plates 56 and 58 have the same optical axis that is tilted 45 degrees with respect to x-axis as shown in FIGS. 12A and 12B.

Light beams along the upper left and lower right optical paths passing through the polarization controller 54 undergo a 90 degree rotation of the polarization direction, similar to the case of the first embodiment, by the presence of the ½ wave plates 56 and 58. A light beam along the upper right optical path does not pass through both the ½ wave plates 56 and 58, and its polarization direction does not change either. A light beam along the lower left optical path is subjected to a 90-degree rotation by the first ½ wave plate 56 and then to an opposite 90-degree rotation by the second ½ wave plate 58, and eventually it does not experience any change of polarization direction between before and after the passage through the polarization controller 54. Thus, substantially the same operation is performed as that of the variable branching ratio beam splitter 10 included in the variable optical gain equalizer 1 of the first embodiment.

Figure 13:
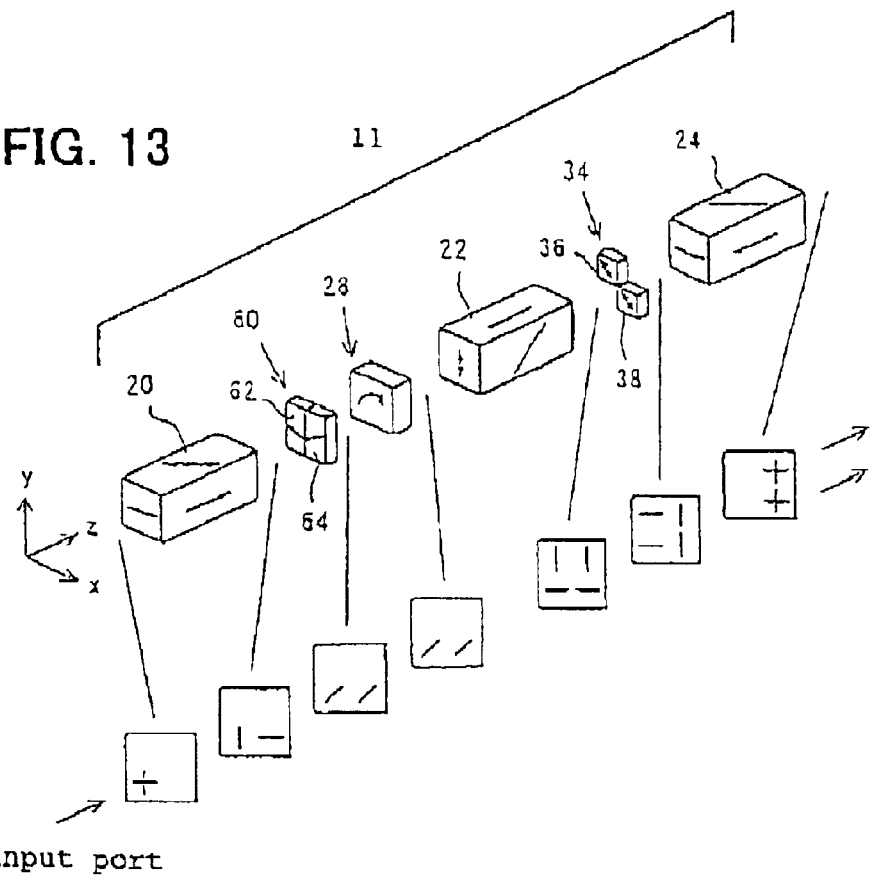
FIG. 13 is an explanatory diagram of another variant of the variable branching ratio beam splitter employed in the first to third embodiments.

FIG. 13 shows a modified configuration of the polarization rotator interposed between the birefringent element for separation and the birefringent element for optical path control, illustrating the relationship of arrangement of optical elements, as well as the change of the polarization state between before and after the passage of light beams through the optical elements. This variable branching ratio beam splitter 11 is substantially the same as the variable branching ratio beam splitter 10 of FIG. 1 in configuration except for the part of the polarization rotator 60, and hence the same reference numerals as in FIG. 1 are given to identical parts expecting the polarization rotator 60. It is natural that the part of the polarization controller 34 may be substituted by the configuration of the polarization controller 54 as shown in FIG. 11.

Figure 14:
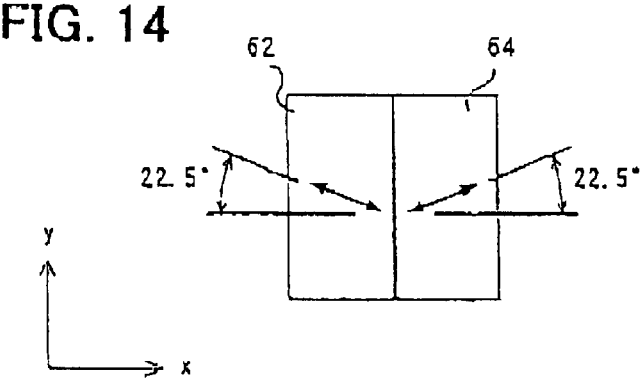
FIG. 14 is an explanatory diagram of the geometry and optical axis of the ½ wave plate making up the polarization rotator of the another variant.

The polarization rotator 60 of this example consists of a pair of ½ wave plates 62 and 64 of quartz having symmetric optical axes, disposed on the left and right optical paths, respectively, when viewed z direction. FIG. 14 shows the orientation of the optical axes of the pair of ½ wave plates 62 and 64. The ½ wave plate 62 on the left optical path has the optical axis tilted 22.5 degrees with respect to x-axis, and the ½ wave plate 64 has the optical axis tilted −22.5 degrees with respect to x-axis. Thus, the vertical polarization along the left optical path input to this polarization rotator 60 is rotated 45 degrees and the horizontal polarization along the right optical path is rotated −45 degrees so that the polarization directions of the two light beams become parallel to each other. The two light beams enter the next variable polarization rotator 28. Then, the orientation of the rotation control of the polarization direction by the variable polarization rotator 28 is set to the angular range of −45 degrees to +45 degrees so that the operation of the variable branching ratio beam splitter 11 is eventually substantially the same as that of the variable branching ratio beam splitter 10 of FIG. 1.

As an alternative, in order to provide a control of the rotation angle of the polarization direction, the electric field applied to the liquid crystal polarization control element may be controlled, or the linear phase shifter may mechanically rotated. Therefore, the variable branching ratio beam splitter may include the variable polarization rotator in the form of a liquid crystal polarization rotator or a rotatable linear phase shifter, in lieu of the 90-degree variable Faraday rotator.

The variable optical gain equalizer according to the embodiments of the present invention enables an input light beam to be converted into an output light beam having a desired spectrum. As a result, it is possible to easily perform the gain equalization in the optical communication systems and to flexibly accommodate the variances of transmission characteristics arising from the change with time or switching of the paths. The variable branching ratio beam splitter according to the embodiments of the present invention is available for any application in which the input light beam is branched at an arbitrary ratio, for output, in addition to the use in the above variable optical gain equalizer.

While the present invention has been described in detail by way of illustrative and exemplary embodiments thereof, it will be apparent to those skilled in the art to make various alterations and modifications of the invention set forth herein, without departing from the spirit of the invention. Therefore, all such alterations and modifications are construed to be included within the scope of the present invention, except insofar as limited by the prior art.

What is claimed is:

1. A variable optical gain equalizer comprising:

a variable branching ratio beam splitter having a variable polarization rotator, said beam splitter branching an input light beam into two light beams at an arbitrary power ratio, through control of the rotation angle of the polarization direction by said variable polarization rotator;

an optical filter presenting different filter characteristics to said two branched output light beams; and a polarization coupler for polarization coupling said two light beams that have passed through said optical filter;

wherein the rotation angle of the polarization direction is controlled by said variable polarization rotator so as to vary the spectra of said output light beams.

2. A variable optical gain equalizer comprising:

a variable branching ratio beam splitter for branching an input light beam into two light beams for output at an arbitrary ratio;

an optical filter associated with at least one of branched outputs of said variable branching ratio beam splitter; and an optical coupler for coupling said branched two output light beams together;

wherein the branching ratio of said variable branching ratio beam splitter is controlled so as to be able to adjust the spectra of light beams to finally be coupled by said optical coupler.

3. A variable optical gain equalizer comprising:

a beam multi-branching unit for branching an input light beam into three or more light beams;

an optical filter associated with at least one of branched outputs of said beam multi-branching unit; and an optical star coupler for coupling together light beams branched by said beam multi-branching unit;

wherein said beam multi-branching unit includes a variable branching ratio beam splitter disposed at one or more branched parts of said beam multi-branching unit, for branching an input light beam into two light beams for output at an arbitrary ratio; and wherein the branching ratio of said variable branching ratio beam splitter is controlled so as to be able to adjust the spectra of light beams to finally be coupled together by said optical star coupler.

4. A variable optical gain equalizer comprising:

a beam multi-branching unit including a plurality of variable branching ratio beam splitters which are in cascade connection, each variable branching ratio beam splitter branching an input beam into two light beams for output at an arbitrary ratio;

an optical filter associated with at least one of branched outputs of said beam multi-branching unit; and an optical star coupler for coupling together light beams branched by said beam multi-branching unit;

wherein the branching ratio of each of said plurality of variable branching ratio beam splitters is properly controlled so as to be able to adjust the spectra of light beams to finally be coupled together by said optical star coupler.

5. A variable optical gain equalizer comprising:

a variable branching ratio beam splitter having a variable polarization rotator, said beam splitter branching an input light beam into two light beams at an arbitrary power ratio, through control of the rotation angle of the polarization direction by said variable polarization rotator;

an optical filter presenting different filter characteristics to said two branched output light beams; and a polarization coupler for polarization coupling said two light beams that have passed through said optical filter;

wherein the rotation angle of the polarization direction is controlled by said variable polarization rotator so as to vary the spectra of said output light beams, wherein said polarization coupler includes:

a 45-degree polarization rotator for rotating 45 degrees the polarization direction of two light beams that have passed through said optical filter; and a birefringent element for coupling which couples together ordinary light components of one output light beam and extraordinary light components of the other output light beam, of two light beams that have passed through said 45-degree polarization rotator.

6. The variable optical gain equalizer according to claim 5, wherein said 45-degree polarization rotator is a 45-degree Faraday rotator.

7. The variable optical gain equalizer according to claim 5, wherein said 45-degree polarization rotator is a linear phase shifter.

8. The variable optical gain equalizer according to claim 3 or 4, wherein all said variable branching ratio beam splitters at the final stage of said beam multi-branching unit are associated with corresponding optical filters each having different optical filter characteristics.

9. The variable optical gain equalizer according to any one of claims 1 to 4, wherein said optical filter includes a dielectric multilayered film filter.

10. The variable optical gain equalizer according to any one of claims 1 to 4, wherein said optical filter includes an etalon filter.

11. The variable optical gain equalizer according to any one of claims 1 to 4, wherein said optical filter includes an optical fiber grading filter.

12. The variable optical gain equalizer according to any one of claims 1 to 4, wherein all optical elements used are mounted on a single substrate or housed in a single enclosure.

13. A variable optical gain equalizer comprising:

a variable branching ratio beam splitter which includes, at spaced apart locations in the mentioned order, a birefringent element for separation that separates light beams whose polarization directions are orthogonal to each other, input from the same optical path, into different optical paths; a birefringent element for optical path control that controls the optical path depending on the polarization direction; and a birefringent element for synthesis that synthesizes light beams whose polarization directions are orthogonal to each other, traveling along different optical paths;

wherein said variable branching ratio beam splitter includes, between said birefringent element for separation and said birefringent element for optical path control, a polarization rotator for converting the polarization direction from orthogonal relationship to parallel relationship; and a variable polarization rotator for rotating arbitrary angles the polarization direction of light beams having parallel relationship, converted by said polarization rotator;

wherein said variable branching ratio beam splitter includes, between said birefringent element for optical path control and said birefringent element for synthesis, a polarization controller for rotating 90 degrees the polarization direction of light beams traveling along two optical paths having specific diagonal relationship, said polarization controller keeping the polarization direction of light beams traveling along two optical paths having the other diagonal relationship; and wherein the angle of rotation of the polarization direction effected by said variable polarization rotator is controlled so as to branch an input light beam for output at a properly adjusted ratio.

14. The variable optical gain equalizer according to claim 13, wherein
said variable polarization rotator is a 90-degree Faraday rotator comprised of a combination of a Faraday element and an electromagnet applying a variable magnetic field to said Faraday element.

15. The variable optical gain equalizer according to claim 13, wherein
said variable polarization rotator includes a liquid crystal polarization rotator.

16. The variable optical gain equalizer according to claim 13, wherein
said variable polarization rotator includes a rotatable linear phase shifter.

17. The variable optical gain equalizer according to claim 13, wherein
said polarization rotator includes a linear phase shifter disposed on one optical path of two optical paths separated by said birefringent element.

18. The variable optical gain equalizer according to claim 13, wherein
said polarization rotator includes a pair of linear phase shifters each disposed on corresponding one of two optical paths separated by said birefringent element for separation, said pair of liner phase shifters each having an optical axis that points the symmetrical direction.

19. The variable optical gain equalizer according to claim 13, wherein
said polarization controller is comprised of a first linear phase shifter disposed on both one of two optical paths having said specific diagonal relationship in which the polarization directions are rotated 90 degrees and an optical path adjoining said one path, and a second linear phase shifter disposed on both the other of said two optical paths having said specific diagonal relationship in which the polarization directions are rotated 90 degrees and an optical path adjoining said the other, said first and second linear phase shifters being disposed in an overlapped manner on said optical paths.

20. The variable optical gain equalizer according to claim 13, wherein
said birefringent element is formed of a plane-parallel rutile single crystal.

21. The variable optical gain equalizer according to any one of claims 16 to 19, wherein
said linear phase shifter is a ½ wave plate made of quartz.

22. A variable branching ratio beam splitter comprising, at spaced apart locations in the mentioned order:
a birefringent element for separation that separates light beams whose polarization directions are orthogonal to each other, input from the same optical path, into different optical paths;
a birefringent element for optical path control that controls the optical path depending on the polarization direction; and
a birefringent element for synthesis that synthesizes light beams whose polarization directions are orthogonal to each other, traveling along different optical paths;
wherein said variable branching ratio beam splitter comprises, between said birefringent element for separation and said birefringent element for optical path control:
a polarization rotator for converting the polarization direction from orthogonal relationship to parallel relationship; and
a variable polarization rotator for rotating arbitrary angles the polarization direction of light beams having parallel relationship, converted by said polarization rotator;
wherein said variable branching ratio beam splitter comprises, between said birefringent element for optical path control and said birefringent element for synthesis:
a polarization controller for rotating 90 degrees the polarization direction of light beams traveling along two optical paths having specific diagonal relationship, said polarization controller keeping the polarization direction of light beams traveling along two optical paths having the other diagonal relationship; and
wherein the angle of rotation of the polarization direction effected by said variable polarization rotator is controlled so as to branch an input light beam for output at a properly adjusted ratio.

23. The variable branching ratio beam splitter according to claim 22, wherein
said variable polarization rotator is a 90-degree Faraday rotator comprised of a combination of a Faraday element and an electromagnet applying a variable magnetic field to said Faraday element.

24. The variable branching ratio beam splitter according to claim 22, wherein
said variable polarization rotator includes a liquid crystal polarization rotator.

25. The variable branching ratio beam splitter according to claim 22, wherein
said variable polarization rotator includes a rotatable linear phase shifter.

26. The variable branching ratio beam splitter according to claim 22, wherein
said polarization rotator includes a linear phase shifter disposed on one optical path of two optical paths separated by said birefringent element.

27. The variable branching ratio beam splitter according to claim 22, wherein
said polarization rotator includes a pair of linear phase shifters each disposed on corresponding one of two optical paths separated by said birefringent element for separation, said pair of liner phase shifters each having an optical axis that points the symmetrical direction.

28. The variable branching ratio beam splitter according to claim 22, wherein said polarization controller is comprised of a first linear phase shifter disposed on both one of two optical paths having said specific diagonal relationship in which the polarization directions are rotated 90 degrees and an optical path adjoining said one path, and a second linear phase shifter disposed on both the other of said two optical paths having said specific diagonal relationship in which the polarization directions are rotated 90 degrees and an optical path adjoining said the other, said first and second linear phase shifters are disposed in an overlapped manner on said optical paths.

29. The variable branching ratio beam splitter according to claim 22, wherein said birefringent element is formed of a plane-parallel rutile single crystal.

30. The variable branching ratio beam splitter according to any one of claims 25 to 28, wherein said linear phase shifter is a ½ wave plate made of quartz.

* * * * *